United States Patent
Bates et al.

(10) Patent No.: US 6,892,325 B2
(45) Date of Patent: May 10, 2005

(54) METHOD FOR DISPLAYING VARIABLE VALUES WITHIN A SOFTWARE DEBUGGER

(75) Inventors: Cary Lee Bates, Rochester, MN (US);
Steven Gene Halverson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 09/995,192

(22) Filed: Nov. 27, 2001

(65) Prior Publication Data

US 2003/0101379 A1 May 29, 2003

(51) Int. Cl.[7] .............................................. G06F 11/00
(52) U.S. Cl. ..................... 714/38; 714/35; 717/127; 717/129
(58) Field of Search ................. 714/38, 35; 717/127, 717/129

(56) References Cited

U.S. PATENT DOCUMENTS 6,754,891 B1 * 6/2004 Snyder et al. ............... 717/128
2003/0023955 A1 * 1/2003 Bates et al. ................. 717/129
2003/0028861 A1 * 2/2003 Wallman et al. ............ 717/128
2003/0061542 A1 * 3/2003 Bates et al. .................. 714/38

* cited by examiner

*Primary Examiner*—Robert Beausoliel
*Assistant Examiner*—Yolanda Wilson
(74) *Attorney, Agent, or Firm*—Dillon & Yudell, LLP

(57) ABSTRACT

A method for displaying variable values within a software debugger is disclosed. A group of variables is extracted from a program monitored by a software debugger. A user is allowed to designate a stopping point, such as a breakpoint, within the program and a subset of variables from the group of variables to be associated with the designated stopping point. During an execution of the program within the software debugger, only the values of the subset of variables are updated when the program execution stopped at the designated stopping point. The updated values of the subset of variables are then displayed on a monitor window of the software debugger.

9 Claims, 3 Drawing Sheets

| STOPPING POINTS | VARIABLES |
|---|---|

Fig. 4

METHOD FOR DISPLAYING VARIABLE VALUES WITHIN A SOFTWARE DEBUGGER

BACKGROUND OF THE INVENTION

1. Technical Field

The present invention relates to software development in general, and in particular to a software debugger. Still more particularly, the present invention relates to a method for displaying variable values within a software debugger.

2. Description of the Prior Art

The process of eliminating errors during software development is commonly known as debugging. Debugging can be quite costly and time consuming, depending on the complexity of the software being developed. Accordingly, software tools, such as debuggers, have been developed for reducing debugging cycle time. Debuggers typically execute as self-contained processes for controlling an application program under study through operating system primitives designed for that purpose.

An application program usually includes data and functions that operate on those data. The data and functions are defined in a source file. A tool called a compiler reads the source file and produces an object file. The compiler typically works in conjunction with other tools, such as an assembler, a linker and an optimizer, to accomplish this task. The object file contains bits that can be loaded into a computer memory to be executed. After having been loaded into the computer memory, the bits are called a program image. The object file also contains a symbol table that maps some of the original source information, such as variable and function names, onto addresses, offsets, sizes, and other pertinent properties of the program image. Quite often, the symbol table is not made part of the program image itself, but remains in the object file where other programs, such as the debugger, can read and analyze it.

A debugger can be used to examine the program image of a program in its execution state. Because the debugger has access to the symbol table, it allows a programmer to interact with the target process in terms of the names found in the source file. By going to the symbol table and looking up the variable's address and type, the debugger obtains the information it needs to satisfy the request from the programmer.

A debugger is often used to intercept or monitor the thread of control through a running program. It is usually the case that either the debugger or the target program is in control, but not both. If the target program is running, the programmer can interact directly with the target program while the debugger lies dormant. If the debugger is running, the programmer has the attention of the debugger and the target program is usually stopped (i.e., its program counter advances no further). When the debugger is running, it is said to be in control; when the debugger causes the target program to begin (or resume) execution, the debugger relinquishes control. The debugger will regain control after the target program counter reaches a pre-determined address. The debugger can deposit a machine instruction at that address, designed to cause some trap or to cause an operating system service to be called when it is executed. By virtue of prior arrangements between the debugger and the operating system, two things happen when the target program reaches one of those instructions: 1) the execution of the target program is put aside or stopped, and 2) the debugger is notified of the event and re-gains control. The debugger is able to determine the location of the event by examining program image state information saved by the operating system. Such special instructions, or the loci of such instructions, are called breakpoints. Breakpoints are usually set at the direction of the programmer, who may want to know if and when execution reaches a certain point in an application program, and may further desire to examine certain state information after the breakpoint has been triggered.

Debuggers are commonly implemented with a graphical user interface called a monitor window (or watch window). Typically, a list of variables and their respective values are displayed within a monitor window during the operation of the debugger. The variable values are refreshed at every breakpoint, which means that every time a breakpoint is hit, the debugger must retrieve the values of all the variables before displaying them in the monitor window. The data retrieval process often presents a performance problem to the debugger because many variable values must be retrieved within a short time frame. Even though a programmer usually does not concern himself/herself with all the variable values at most of the breakpoints within a program, but the programmer must endure the performance penalty of updating all variable values at every breakpoint.

Consequently, it is desirable to provide a better mechanism to monitor and to display variable values of a program within a debugger.

SUMMARY OF THE INVENTION

In accordance with a preferred embodiment of the present invention, a group of variables is extracted from a program monitored by a software debugger. A user is allowed to designate a stopping point, such as a breakpoint, within the program and a subset of variables from the group of variables to be associated with the designated stopping point. During an execution of the program within the software debugger, only the values of the subset of variables are updated when the program execution stopped at the designated stopping point. The updated values of the subset of variables are then displayed on a monitor window of the software debugger.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a pictorial illustration of a variable association table, in accordance with a preferred embodiment of the present invention.

DETAILED DESCRIPTION OF A PREFERRED EMBODIMENT

Figure 1:
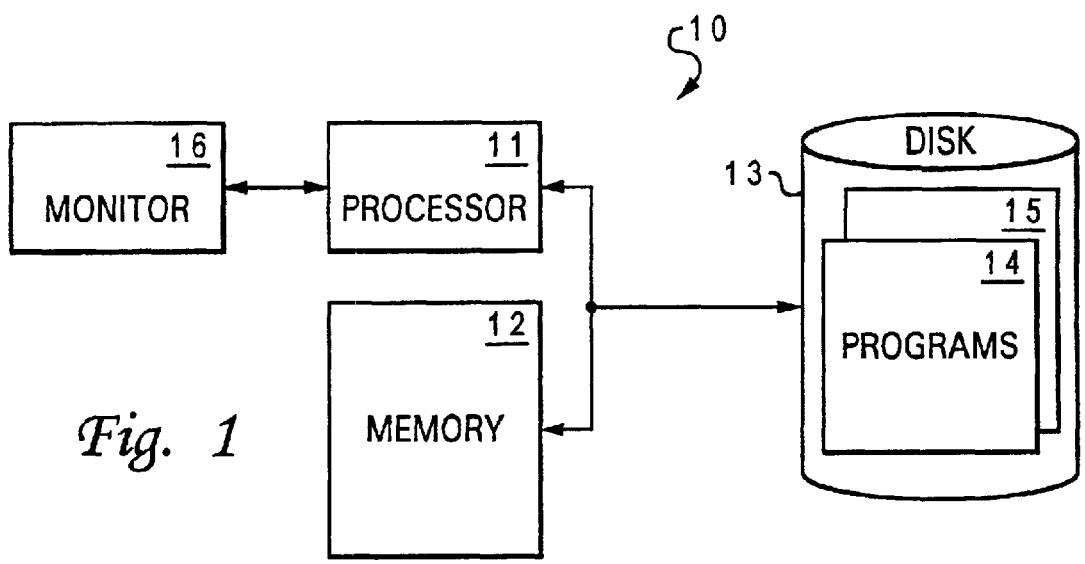
FIG. 1 is a block diagram of a data processing system in which a preferred embodiment of the present invention is applicable.

Referring now to the drawings and in particular to FIG. 1, there is depicted a block diagram of a data processing system in which a preferred embodiment of the present invention is applicable. As shown, a data processing system 10 includes a processor 11, a memory 12, a hard disk 13, and a monitor 16. Programs 14 are preferably stored within hard disk 13 until programs 14 are needed for execution, at which time programs 14 are brought into memory 12 so that programs 14 can be directly accessed by processor 11. Processor 11 selects a part of memory 12 to read and/or write by using an address processor 11 gives to memory 12 along with a request to read and/or write. Usually, the reading and interpretation of an encoded instruction at an address causes processor 11 to fetch a subsequent instruction, either at a subsequent address or some other address. Hard disk 13 stores the bits that represent executable program steps (i.e., program image) as well as a symbol table 15 for each program that ties its bits back to the information that are in the source code. Symbol table 15 is used, usually by programs such as linkers or debuggers, to interpret variable or function names as addresses in the executable program. The columns of symbol table 15 preferably include:

1. NAME: For a variable, it is the name of the variable, either per se or with some simple encoding done by the compiler. For a function, it is a name in which the function signature has been encoded by the compiler. For a type, particularly for a structure definition, it is the corresponding type or structure name.
2. TYPE: This indicates the primitive type, or derived type, as appropriate, for the entity named in the NAME column.
3. CLASS: This is a basic designation of what the entry represents: a function, a structure, a structure member, a local variable, etc.
4. ADDRESS: The address, or offset, as appropriate, of the symbol is defined in this entry. For types, which in and of themselves take no storage, the size is given in this field.
5. LINK: A pointer to an associated "parent" entry in the symbol table. For example, all structure members "point" to their structure declaration entry.

To learn about the behavior of an application program, it is often instructive to monitor its progress during execution. Such can be done by arranging for the application program to stop at certain prearranged points in its sequence of steps, at which time data contents in various addresses within memory 12 can be examined. Those prearranged points are typically known as breakpoints. A succession of arrivals at different breakpoints gives a programmer a feel for the flow of the application program as well as the data contents and intermediate results at those breakpoints.

Figure 2:
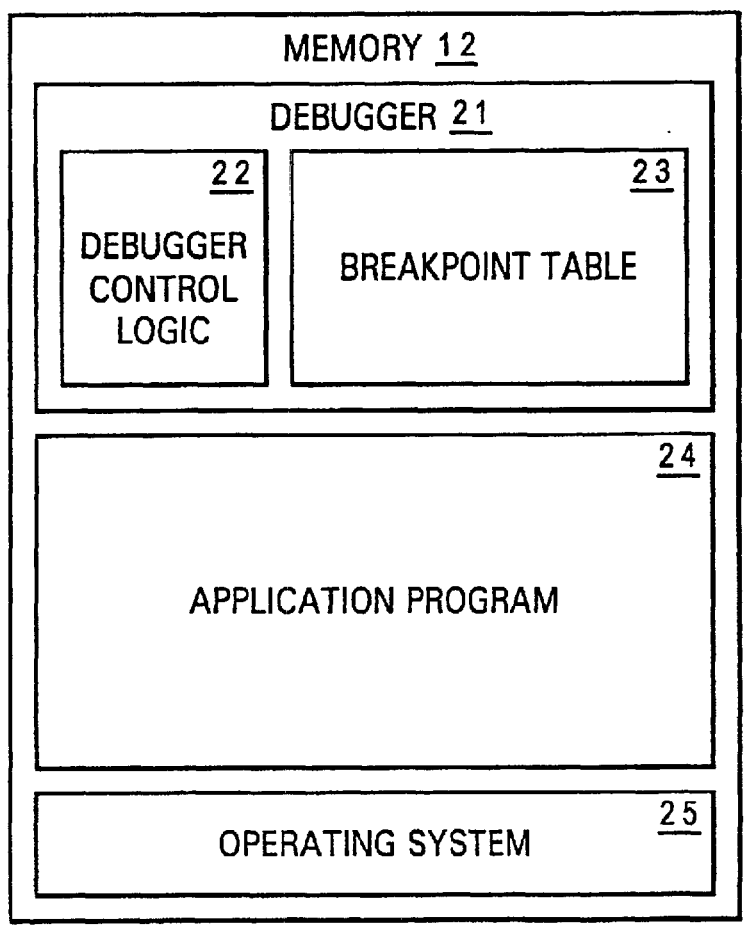
FIG. 2 is a block diagram of the contents within a memory of the data processing system from FIG. 1, in accordance with a preferred embodiment of the present invention.

With reference now to FIG. 2, there is illustrated a block diagram of the contents within memory 12 from FIG. 1, in accordance with a preferred embodiment of the present invention. As shown, memory 12 includes a debugger 21, an application program 24, and an operating system 25. Application program 24 is controlled and observed by debugger 21. Debugger 21 contains a debugger control logic 22 and a breakpoint table 23. Debugger control logic 22 includes sequences of instructions for controlling the behavior of debugger 21. Breakpoint table 23 includes an entry for each of the breakpoints that have been inserted in application program 24. Breakpoint table 23 also contains information that allows each breakpoint to be interpreted in a number of ways, depending on the context of application program 24 when the breakpoint is reached.

It is recognized that not all variable values within a program, such as application program 24, are important to a programmer at all times during programming. Thus, only the variable values that have been deemed to be important by the programmer at a particular point in the program are monitored. While this may include any variable specifically selected by the programmer, it can also include any variable previously displayed at a breakpoint.

Figure 3:
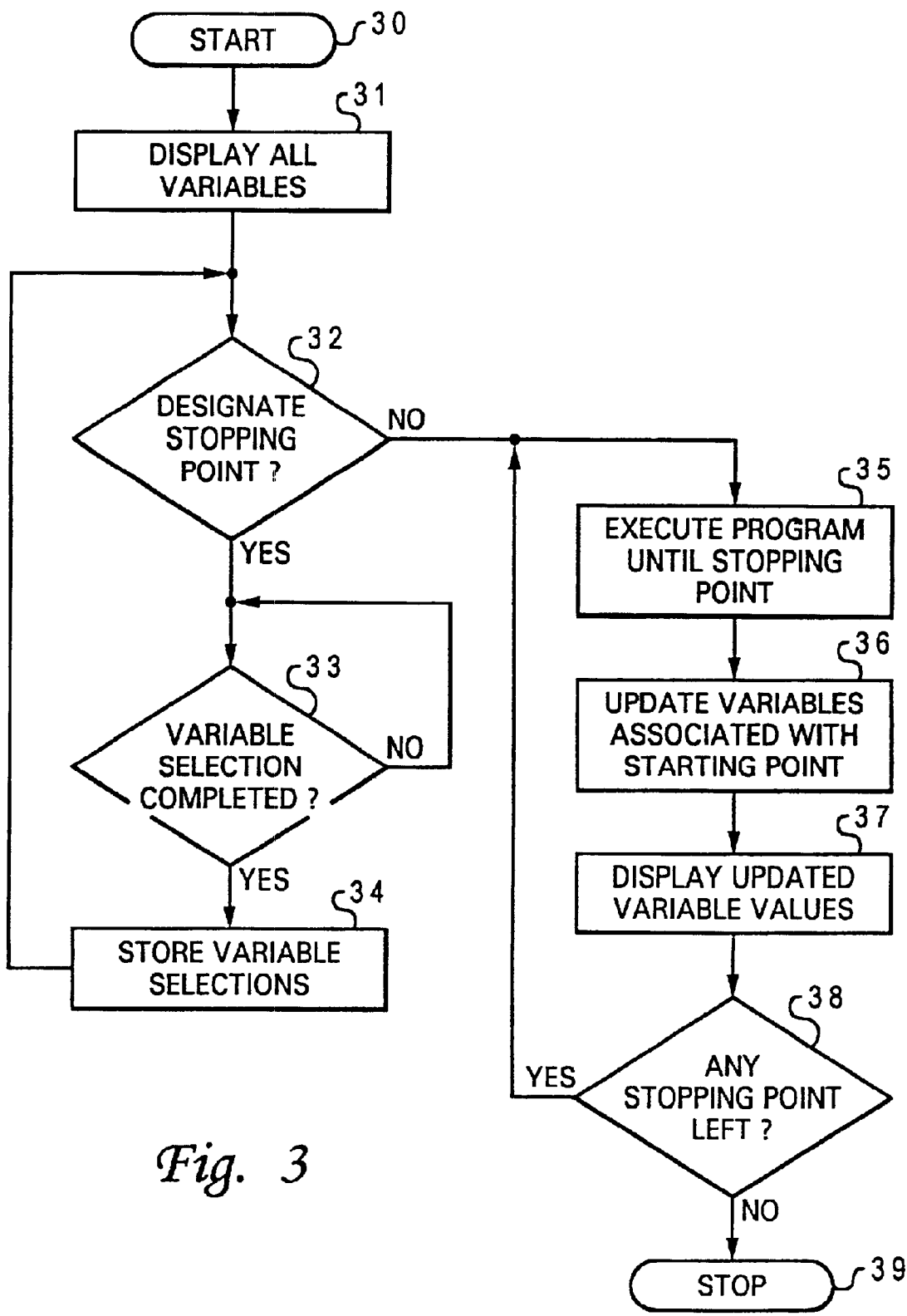
FIG. 3 is a high-level logic flow diagram of a method for displaying variable values within a debugger, in accordance with a preferred embodiment of the present invention.

Referring now to FIG. 3, there is depicted a high-level logic flow diagram of a method for displaying variable values within a debugger, in accordance with a preferred embodiment of the present invention. Starting at block 30, all variables within a program are displayed in a first section of a monitor window, as shown in block 31. A determination is then made as to whether or not a user wants to designate a stopping point in the program, as depicted in block 32. A stopping point can be, but not necessarily, a breakpoint. After the user has designated a stopping point, the debugger then waits for the user to select any variable that the user would like to associate with the designated stopping point. The debugger allows the user to associate as many variables with the designated stopping point as the user desired, and the process continues until the variable selection is completed, as shown in block 33. After the variable selection has been completed, all the user selected variables are stored in a variable association table, as depicted in block 34. Details of the variable association table will be further explained in FIG. 4. The process then proceeds back to block 32 to allow the user to designate another stopping point if the user desired to do so. If the user does not want to designate another stopping point, the debugger then continues to execute the program up to the stopping point specified by the user, as shown in block 35. At this point, only the user selected variables (from block 34) that are associated with the stopping point are updated with their most current respective values, as depicted in block 36, while the remaining variables in the program are not updated. The user selected variables and their respective updated values are then displayed, as shown in block 37, preferably in a second section of the monitor window. Next, a determination is made as to whether there is any other stopping point left in the program, as depicted in block 38. If there is another stopping point left in the program, then the process proceeds back to block 35; otherwise, the debugger continues to execute the remaining portion of the program until the process stops at block 39.

Figure 4:
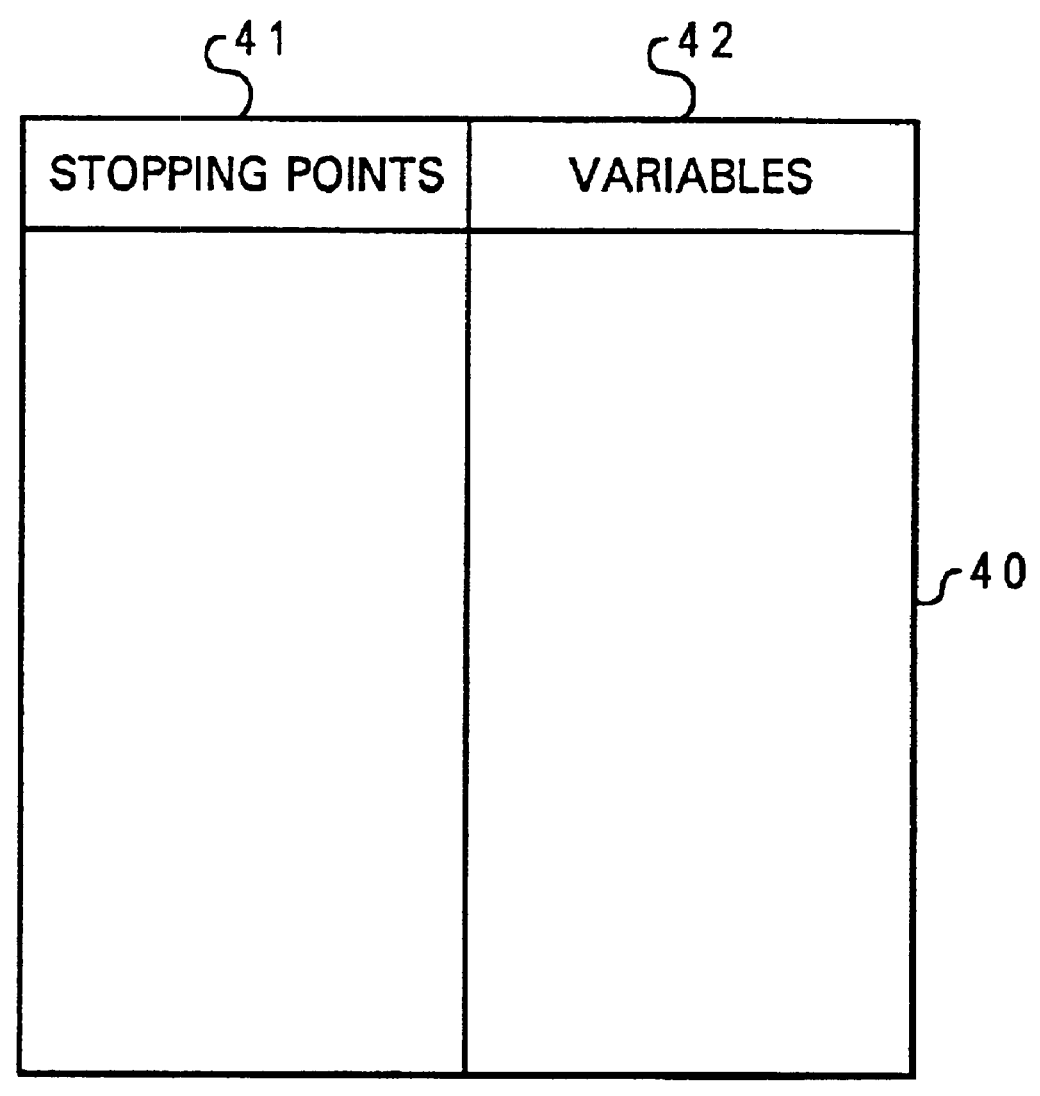

With reference now to FIG. 4, there is depicted a pictorial illustration of a variable association table, in accordance with a preferred embodiment of the present invention. As shown, a variable association table 40 includes two columns, namely, a stopping point column 41 and a variable column 42. Each row of stopping point column 41 contains a stopping point that was designated by the user (from block 32 in FIG. 3). An adjacent row in variable column 42 contains all the variables that are selected by the user to be associated with the corresponding stopping point stored in the same row of stopping point column 41 (from block 33 in FIG. 3). Thus, each stopping point in stopping point column 41 is associated with at least one variable in the same row of variable column 42. When the debugger stops at each stopping point contained in stopping point column 41, only the values of the associated variables contained in variable column 42 are updated and displayed in the monitor window of the debugger. Other variables may be displayed, but they will preferably be "grayed out" and no value will be provided.

As has been described, the present invention provides a method for displaying variable values within a software debugger. With the present invention, a user can step through a program within a software debugger at a relatively fast pace, without being slow down by the process of updating all the variables that are being monitored by the software debugger. Because of the locational connection between the selected variables and a particular stopping point within a program, the present invention can use such data even when not restoring the previous environment. For example, after a user sets a stopping point at a particular location, the debugger can determine the variables previously monitored at that location and automatically adds or enables the same variables to a monitor window.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for displaying variable values within a software debugger, said method comprising:
   extracting a plurality of variables from a program monitored by a software debugger;
   allowing a user to designate a stopping point within said program and a subset of variables from said plurality of variables to be associated with said designated stopping point;
   during an execution of said program within said software debugger, updating values of only said subset of variables when said execution of said program stopped at said designated stopping point; and
   displaying said updated values of only said subset of variables, wherein said displaying further includes graying out a variable when displaying said variable if said variable is not one of said subset of variables.

2. The method of claim 1, wherein said stopping point is a breakpoint.

3. The method of claim 1, wherein said method further includes storing said designated stopping point and said subset of variables associated with said designated stopping point in a variable association table.

4. A computer program product residing on a computer usable medium for displaying variable values within a software debugger, said computer program product comprising:
   program code means for extracting a plurality of variables from a program monitored by a software debugger;
   program code means for allowing a user to designate a stopping point within said program and a subset of variables from said plurality of variables to be associated with said designated stopping point;
   program code means for updating values of only said subset of variables, during an execution of said program within said software debugger, when said execution of said program stopped at said designated stopping point; and
   program code means for displaying said updated values of only said subset of variables, wherein said program code means for displaying further includes program code means for graying out a variable when displaying said variable if said variable is not one of said subset of variables.

5. The computer program product of claim 4, wherein said stopping point is a breakpoint.

6. The computer program product of claim 4, wherein said computer program product further includes program code means for storing said designated stopping point and said subset of variables associated with said designated stopping point in a variable association table.

7. A computer system having a software debugger, said computer system comprising:
   a processor;
   a monitor coupled to said processor; and
   a memory coupled to said processor, wherein said memory includes
      means for extracting a plurality of variables from a program monitored by a software debugger;
      means for allowing a user to designate a stopping point within said program and a subset of variables from said plurality of variables to be associated with said designated stopping point;
      means for updating values of only said subset of variables, during an execution of said program within said software debugger, when said execution of said program stopped at said designated stopping point; and
      means for displaying said updated values of only said subset of variables, wherein said means for displaying further includes means for graying out a variable when displaying said variable if said variable is not one of said subset of variabley.

8. The computer system of claim 7, wherein said stopping point is a breakpoint.

9. The computer system of claim 7, wherein said computer system further includes a variable association table for storing said designated stopping point and said subset of variables associated with said designated stopping point.

* * * * *